(12) United States Patent
Saito et al.

(10) Patent No.: US 7,845,051 B2
(45) Date of Patent: Dec. 7, 2010

(54) HINGE DEVICE AND OPENING/CLOSING MECHANISM USING THE HINGE DEVICE

(75) Inventors: Makoto Saito, Ina (JP); Takashi Ogino, Yokohama (JP); Yoshihiro Hemmi, Ina (JP)

(73) Assignee: NHK Spring Co., Ltd., Kanagawa (JP)

( * ) Notice: Subject to any disclaimer, the term of this patent is extended or adjusted under 35 U.S.C. 154(b) by 226 days.

(21) Appl. No.: 11/576,083

(22) PCT Filed: Sep. 27, 2005

(86) PCT No.: PCT/JP2005/017717

§ 371 (c)(1),
(2), (4) Date: Feb. 8, 2008

(87) PCT Pub. No.: WO2006/035757

PCT Pub. Date: Apr. 6, 2006

(65) Prior Publication Data

US 2008/0256748 A1    Oct. 23, 2008

(30) Foreign Application Priority Data

Sep. 30, 2004   (JP)   ............................. 2004-288954

(51) Int. Cl.
*E05D 11/10* (2006.01)
(52) U.S. Cl. .......................................... 16/337; 16/340
(58) Field of Classification Search ................... 16/337, 16/340, 343, 344, 319, 323, 367, 368, 303, 16/330; 248/27.3, 473, 206.1, 226.11
See application file for complete search history.

(56) References Cited

U.S. PATENT DOCUMENTS 3,992,974 A * 11/1976 Miki et al. .................. 411/544
5,190,391 A * 3/1993 Huong ......................... 403/96
5,269,047 A * 12/1993 Lu ............................... 16/340
6,361,257 B1 * 3/2002 Grant .......................... 411/154
6,763,552 B1 * 7/2004 Kitamura et al. .............. 16/337
6,862,779 B1 * 3/2005 Lu et al. ....................... 16/340
7,508,656 B2 * 3/2009 Okahara ....................... 16/337
2003/0046791 A1 * 3/2003 Choi ............................ 16/337

FOREIGN PATENT DOCUMENTS

| JP | 9-329127 A | | 12/1997 |
|---|---|---|---|
| JP | 11-41328 A | | 2/1999 |
| JP | 2002-227832 A | | 8/2002 |
| JP | 2003-56547 A | | 2/2003 |
| JP | 2003056547 A | * | 2/2003 |
| JP | 2003-247532 A | | 9/2003 |
| JP | 2003-343545 A | | 12/2003 |
| JP | 2004-183698 A | | 7/2004 |
| JP | 2004183698 A | * | 7/2004 |
| WO | WO 00/77413 A1 | | 12/2000 |

* cited by examiner

*Primary Examiner*—Jack W. Lavinder
*Assistant Examiner*—Rowland D Do
(74) *Attorney, Agent, or Firm*—McGlew and Tuttle, P.C.

(57) ABSTRACT

Provided is a hinge device which allows the display device to be watched at an arbitrary angle, thus enabling all the passengers to watch the display at an optimum angle, which helps to achieve an improvement in terms of quality and reliable dropping/opening by causing the dropping/opening movement of the display device due to its own weight to be reliable and gentle in the range from the start to an angle of approximately 30°, and which helps to achieve an improvement in terms of operational feel in the free stop range, thus allowing light operation.

2 Claims, 18 Drawing Sheets

(a)

(b)

(a)

(b)

(a)

(b)

(a)

(b)

(a)

(b)

(c)

(a)

(b)

(a)

(b)

HINGE DEVICE AND OPENING/CLOSING MECHANISM USING THE HINGE DEVICE

TECHNICAL FIELD

The present invention relates to a hinge device in which a rotational torque varies according to a rotation angle, and more particularly, to a hinge device which is optimum for use when mounting, to an inner surface of a roof of an automobile, an overhead type liquid crystal display device to be watched by passengers in rear seats, and an opening/closing mechanism using the hinge device.

BACKGROUND ART

A display device for the passengers in the rear seats of an automobile has, for example, a base member provided on the ceiling of the vehicle and a display device provided on a cover member, and the cover member, on which the display member is provided, is connected by a hinge device so that the cover member can be opened, closed, stopped, and retained at an angle making the display easy to be watched. It is desirable for the hinge device to be constructed, for example, such that a relatively low rotational torque (resistance torque) is applied at a start position, that a relatively high rotational toque is applied at an intermediate position, and that a maximum torque capable of maintaining a stopped state is applied at a normal use position. A known conventional hinge device of this type is equipped with: a fixing member provided with a recess and a hole in the rotating direction; a braking member formed of an elastic material and provided with an arm portion extending toward the outer periphery from the rotation center portion, with a protrusion being provided at a free end of the arm portion; and an elastic member for holding the braking member in press contact with the fixing member. High torque is applied to the region where the protrusion of the braking member is held in sliding contact with the fixing member. Low torque is applied to the region where sliding contact of the protrusion is avoided by virtue of the peripheral recess. Maximum torque is applied when the protrusion having dropped into the hole climbs up (see, for example, Patent Document 1).

The operation of this conventional hinge device will be described with reference to FIG. 14.

A range from an angle of 0°, at which a display device 11 is accommodated in a ceiling 12, to an angle of 30° (range T1), is a low-torque range where sliding contact of the protrusion of the braking member is avoided due to the peripheral recess. When the lock is canceled, the display device 11 drops (opens) by substantially 30° due to its own weight. The next range from approximately 30° to 105° (range T2) is a high-torque range where the protrusion of the braking member is held in sliding contact with the fixing member and where manual operation is performed to allow free stop. A normal use position (position T3), where the display device 11 is watched, is a region where maximum torque is generated through transition from fit-engagement to non-fit-engagement (i.e., the protrusion climbs up from the fit-engagement state) of the protrusion of the braking member with the hole of the fixing member and where no positional deviation is caused by vibration, etc. of the vehicle.

Patent Document 1: JP 2003-56547 A

DISCLOSURE OF THE INVENTION

Problems to be solved by the Invention

However, in the conventional hinge device, in which the normal use position (angle) allowing watching corresponds to the position where the protrusion of the braking member is fit-engaged with the hole of the fixing member, the number of holes to be provided in the fixing member is restricted. As a result, the angles allowing watching are limited, and the display is rather hard to see depending upon the line of vision and sitting height of the passenger.

Further, in the conventional hinge device, in the range from the start to an angle of approximately 30° (range T1), which is a low-torque range where sliding contact of the protrusion of the braking member is avoided due to the recess of the fixing member, this low torque is fixed. As a result, the hinge device involves a rather abrupt dropping (opening) of the display device due to its own weight from the start to an angle of approximately 30°, which leads to a problem in terms of quality. On the other hand, an attempt to increase the torque in this range in order to effect a gentle dropping (opening) to thereby achieve an improvement in quality will lead to a situation in which the display device may not drop due to its own weight even when the lock is canceled.

Further, in the conventional hinge device, in the free stop range, which is a range where the protrusion of the braking member is held in sliding contact with the flat surface of the fixing member, the torque generated is always fixed, resulting in a rather heavy operational feel in the manual operation.

Further, the conventional hinge device also has a problem in that the viscosity of the grease increases at low temperature, etc., so it may occur that the display device in the accommodated state will not drop (open) even if the lock is canceled.

The present invention has been made in view of the above-mentioned problems in the prior art. It is an object of the present invention to provide a hinge device which allows the display device to be watched at an arbitrary angle, thus enabling all the passengers to watch the display at an optimum angle, which helps to achieve an improvement in terms of quality and reliable dropping (opening) by causing the dropping (opening) movement of the display device due to its own weight to be reliable and gentle in the range from the start to an angle of approximately 30°, thus ensuring the dropping (opening) thereof, and which helps to achieve an improvement in terms of operational feel in the free stop range, thus allowing light operation, and an opening/closing mechanism using such a hinge device.

Means for Solving the Problems

A hinge device according to the present invention includes: a bracket which is fixed to one member; a shaft which is rotatably attached to the bracket and which is fixed to another member; a braking member which is attached to the shaft so that the braking member is non-rotatable but axially movable and which is held in sliding contact with the bracket and adapted to make mutual relative rotation; and a plate spring member which is attached to the shaft so that the plate spring member is non-rotatable but axially movable and which holds the braking member in press contact with the bracket, characterized in that: a surface of the bracket held in sliding contact with the braking member is provided with a recessed groove one end portion of which is formed as a tapered portion, with the surface of the braking member held in sliding contact with the bracket being provided with a protrusion coming into sliding contact with a sliding contact surface and a recessed groove (including a tapered portion) of the bracket, the protrusion having a flat top portion at least one end of which is formed as a tapered portion continuous with the flat top portion.

With the above-mentioned construction, the braking member is held in press contact with the bracket by the plate spring member, so, when the protrusion of the braking member is situated in the recessed groove of the bracket, the hinge device is in the low-torque range, where sliding contact of the protrusion of the braking member is avoided due to the recessed groove. When the protrusion of the braking member is situated on the tapered portion of the recessed groove of the bracket, the device is in the range where the torque gradually increases, and the position where the protrusion of the braking member is held in sliding contact with the bracket is in the high torque range. Thus, when, for example, the position of the display device where it is accommodated in the ceiling of the vehicle corresponds to the position where the protrusion of the braking member is in the recessed groove of the bracket, that is, in the low torque range, canceling of the lock of the display device causes the display device to start dropping (opening) due to its own weight. Then, when the protrusion of the braking member approaches the tapered portion of the recessed groove of the bracket, the torque increases gradually, so the dropping (opening) of the display device becomes gradually gentle, until the display device stops. When, from that position, the bracket is rotated by hand, the protrusion of the braking member climbs onto the sliding contact surface of the bracket to come into sliding contact therewith. As a result, high torque is generated, and the hinge device is placed in the free stop range, where the passengers in the rear seats are enabled to stop the display device to stop at a desired angle for watching. In this way, according to the hinge device of the present invention, it is possible to allow the display device to be set at an arbitrary angular position, enabling the passengers in the rear seats to watch the display device at an optimum angle.

Further, it is possible to cause the dropping movement of the display device due to its own weight within a fixed range from the start (usually to approximately 30°) to be reliable and gentle.

Further, since the transition to the free stop range is effected through the tapered portion, it is possible to attain a light operational feel.

Further, in the hinge device of the present invention, the rotational torque varies according to the area of the recessed groove of the bracket, the tapering angle of the tapered portion thereof, the area of the flat portion of the top portion of the protrusion of the braking member, the tapering angle of the tapered portion thereof, etc., so it is possible to vary the torque characteristics by varying those factors.

The hinge device according to the present invention is characterized in that initial setting is effected with the tapered portion of the braking member being on an end edge of the recessed groove of the bracket.

With this arrangement, torque for rotating the shaft is generated when the protrusion of the bracket is caused to drop into the recessed groove of the bracket due to the tapered portion. As a result, the other member, for example, the display device, springs out at the initial stage to cause initial start, whereby it is possible to prevent the display device from failing to open, for example, failing to drop by its own weight.

An opening and closing mechanism according to the present invention includes: a plurality of hinge devices each of which is composed of a bracket which is fixed to one member; a shaft which is rotatably attached to the bracket and which is fixed to another member; a braking member which is attached to the shaft so that the braking member is non-rotatable but axially movable and which is held in sliding contact with the bracket and adapted to make mutual relative rotation; and a plate spring member which is attached to the shaft so that the plate spring member is non-rotatable but axially movable and which holds the braking member in press contact with the bracket, characterized in that: a surface of the bracket held in sliding contact with the braking member is provided with a recessed groove one end portion of which is formed as a tapered portion, with the surface of the braking member held in sliding contact with the bracket being provided with a protrusion coming into sliding contact with a sliding contact surface, a recessed groove, and a tapered portion of the bracket, the protrusion having a flat top portion at least one end of which is formed as a tapered portion continuous with the flat top portion; and the respective plate spring members of the plurality of hinge devices have different spring constants, with the plurality of hinge devices connecting one member and another member so that the one member and the other member can open and close.

With this construction, each hinge device differs in the spring constant of the plate spring member, thereby generating a different torque. Thus, it is possible to attain an optimum rotational torque according to the opening/closing member used. For example, when there are used, in a display device provided in the ceiling of the interior of a vehicle, hinge devices one of which has a plate spring member of small spring constant and the other of which has a plate spring member of large spring constant, the hinge device whose plate spring member has a weaker spring force is caused to operate in the range where the dropping of the display device occurs due to its own weight, and the hinge device whose plate spring has a stronger spring force is caused to operate in the free stop range. As a result, it is possible to realize a gentle movement in the range where the display device drops due to its own weight and to attain high torque in the free stop range to stop the display device reliably.

EFFECTS OF THE INVENTION

The hinge device of the present invention provides the following effects:

(1) When employed as a hinge device for mounting a display device to the ceiling of the interior of an automobile so as to allow the display device to open and close, it is possible to set the display device at an arbitrary angle to enable the passengers in the rear seats to watch the display device at an optimum angle. Further, it is possible to cause the dropping movement of the display device due to its own weight to be reliable and gentle within a fixed range from the start. Still further, since the transition to the free stop range is effected through the tapered portion, it is possible to attain a light operational feel.

(2) In the hinge device of the present invention, it is possible to vary the torque characteristics by varying the area of the recessed groove of the bracket, the tapering angle of the tapered portion thereof, the area of the flat portion at the top of the protrusion of the braking member, the tapering angle of the tapered portion thereof, etc.

(3) According to the hinge device of the present invention, it is possible, for example, to prevent the display device from failing to open, for example, failing to perform automatic dropping, when the lock is canceled.

(4) With the small number of parts and the simple structure, its mounting is easy and does not take time and effort. Further, the mounting can be effected with high precision, helping to achieve an improvement in terms of quality. Further, since its structure is simple and requires a small number of parts, and its main portion is formed of a plate member, it is possible to achieve a further reduction in weight and size.

(5) Since the surface of the protrusion of the braking member coming into contact with the bracket (i.e., flat surface of the top portion thereof) is flat, the contact area increases, making it possible to increase the rotational torque. Further, the wear of the protrusion and the bracket is reduced, thus helping to achieve an improvement in terms of durability.

(6) The opening/closing mechanism of the present invention provides the following effects. That is, according to the hinge device of the present invention, it is possible to vary the generated rotational torque by varying the spring constant of the spring member. As a result, when using a plurality of hinge devices whose plate members have different spring constants, if one member and another member are connected so as to allow opening and closing thereof, it is possible to generate a desired rotational torque. Thus, depending on the opening/closing members used, it is possible to attain an optimum desired rotational torque. For example, when there are used, in a display device provided on the ceiling of the interior of an automobile, a plurality of hinge devices one of which has a plate spring member whose spring force is weak and another of which has a plate spring member whose spring force is strong, the hinge device whose spring member has a weak spring force is caused to operate in the range where the display device drops due to its own weight, and the hinge device whose spring member has a strong spring force is caused to operate in the free stop range. As a result, it is possible to cause the movement of dropping of the display device by its own weight to be gentle, and to attain high torque in the free stop range to stop the display device reliably.

BEST MODE FOR CARRYING OUT THE INVENTION

In the following, the hinge device of the present invention will be described in more detail with reference to the accompanying drawings.

FIG. 1 is a perspective view of a hinge device according to an embodiment of the present invention, FIG. 2 is a front view of a hinge device according to an embodiment of the present invention, and FIG. 3 is an exploded perspective view of a hinge device according to an embodiment of the present invention.

A hinge device 10 is composed of a bracket 3 which is fixed to one member, for example, the ceiling of the interior of an automobile, a shaft 1 which is rotatably attached to the bracket 3 and to which the other member, for example, a display device, is fixed, a braking member 4 which is attached to the shaft 1 so as to be non-rotatable but axially movable and which is in sliding contact with the bracket 3 and adapted to perform mutual relative rotation, and a plate spring member 5 which is attached to the shaft 1 so as to be non-rotatable but axially movable and which holds the braking member 4 in press contact with the bracket 3, with the braking member 4 being restricted in its axial movement by a flat washer 6 while held in press contact with the bracket 3 by the plate spring member 5.

That is, the shaft 1 is rotatable with respect to the bracket 3, and the braking member 4 is non-rotatable with respect to the shaft 1 but axially movable, so the braking member 4 rotates together with the shaft 1 and can move in the axial direction.

The plate spring member 5 is non-rotatable with respect to the shaft 1 but axially movable, so the plate spring member 5 rotates together with the shaft 1, and can move in the axial direction. Thus, since the bracket 3 is fixed to one member, when the shaft 1 rotates, the braking member 4 rotates while held in sliding contact with the bracket 3.

The hinge device will be described in more detail. First, FIG. 4 shows the shaft 1. FIG. 4(a) is a perspective view and FIG. 4(b) is a front view of the shaft. The shaft 1 is composed of a flange portion 1a, a main shaft portion 1b, and a support shaft portion 1c. The main shaft portion 1b and the support shaft portion 1c have a non-circular sectional configuration. In this embodiment, the two potions are of a W-D configuration. The support shaft portion 1c is provided with fixing holes 1d for fixation to the other member.

FIG. 5(a) is a perspective view and FIG. 5(b) is a side view of a friction plate. A friction plate 2 is formed as a circular member, and has at its center a non-circular hole 2a corresponding to the non-circular sectional configuration of the main shaft portion 1b of the shaft 1. Accordingly, the friction plate 2 is fitted onto the main shaft portion 1b of the shaft 1 so as to be non-rotatable but axially movable.

FIG. 6(a) is a perspective view and FIG. 6(b) is a front view of the bracket. A bracket 3 is formed in an angular configuration composed of a horizontal portion 3A to be fixed to one member and a vertical portion 3B to be held in sliding contact with the braking member 4. The bracket 3 is formed in a sliding contact surface 3c of the vertical portion 3B held in sliding contact with the braking member 4 are recessed grooves 3a, which are arranged concentrically around a hole 3e and one end portion of each of which is formed as a tapered portion 3b. In this embodiment, a pair of the recessed grooves are provided in point symmetry. The shaft 1 is rotatably fitted into the hole 3e. The horizontal portion 3A is provided with fixing holes 3f for fixation to one member. The bracket 3 is mounted to one member by using the fixing holes 3f and screws or the like. A stopper 3g protrudes from the bracket 3 of this embodiment.

FIG. 7(a) is a perspective view and FIG. 7(b) is a front view of the braking member. A braking member 4 is held in sliding contact with the bracket 3 to vary the rotational torque, and is formed as a circular plate provided with protrusions 4a to be held in sliding contact with the sliding contact surface 3c and the recessed grooves 3a (including tapered portions 3b) of the bracket 3. The top portion of each of the protrusion 4a is formed as a flat portion 4b, and both end portions thereof, which are continuous with the flat portion 4b, are formed as tapered portions 4c. It is also possible to provide the tapered portion 4c at one end only. The braking member 4 has at its center a non-circular hole 4d corresponding to the non-circular configuration of the main shaft portion 1b of the shaft 1, and is fitted onto the main shaft portion 1b so as to be non-rotatable but axially movable. The protrusions 4a of this embodiment are provided in pairs in point symmetry with respect to the non-circular hole 4d.

FIG. 8(a) is a perspective view, FIG. 8(b) is a plan view, and FIG. 8(c) is a front view of the plate spring member. In this embodiment, the plate spring member 5A(5) is a spring washer. The spring washer 5A is formed of a plate spring material in a circular configuration, has at its center anon-circular hole 5a corresponding to the non-circular sectional configuration (W-D configuration) of the main shaft portion 1b of the main shaft 1, and is formed as a curved washer with bent portions 5b. The spring washer 5A(5) is fitted onto the main shaft portion 1b of the shaft 1 so as to be non-rotatable but axially movable, and holds the braking member 4 in press contact with the bracket 3.

FIG. 9(a) is a perspective view and FIG. 9(b) is a front view of another plate spring member. The plate spring member 5B(5) of this example is formed of a plate spring material in a circular configuration, has at its center a non-circular hole 5a corresponding to the non-circular configuration of the main shaft portion 1b of the shaft 1, and is formed as a spring washer of a curved (not conical) configuration.

The plate spring member 5A shown in FIG. 8 has a large spring force (spring constant) since it has the bent portions 5b, and the plate spring member 5B shown in FIG. 9 has a small spring force since it is just curved. The plate spring members 5A, 5B are only shown as examples of the plate spring member 5, and should not be construed restrictively. A suitable spring member may be selected in correspondence with the torque characteristics of the opening/closing member used.

FIG. 10(a) is a perspective view and FIG. 10(b) is a side view of the flat washer. The flat washer 6 has at its center a non-circular hole 6a corresponding to the non-circular sectional configuration (W-D configuration) of the main shaft portion 1b of the shaft 1, and is fitted onto the main shaft portion 1b of the shaft 1 so as to be non-rotatable but axially movable. The flat washer 6 of this embodiment is provided with a lock member 6b extending from the outer peripheral edge thereof. The lock member 6b is locked to the stopper 3g of the bracket 3, whereby rotation of the flat washer 6 is locked.

Next, a method of assembling the above-mentioned components will be described. As shown in FIG. 3, the friction plate 2, the bracket 3, the braking member 4, the plate spring member 5, and the flat washer 6 are fitted in the stated order onto the main shaft portion 1b of the shaft 1, and are pressed against the flange 1a of the shaft 1, with the end portion of the main shaft portion 1b being swaged for detachment prevention. At this time, the swaging is effected, with the plate spring member 5 being deflected, that is, with the braking member 4 being pressed against the bracket 3. In this way, the hinge device 10 as shown in FIG. 1 is assembled. At this time, by applying grease between the bracket 3 and the friction plate 2, between the bracket 3 and the braking member 4, and between the braking member 4 and the plate spring member 5, it is possible to achieve an improvement in terms of durability.

FIG. 14 is a schematic view illustrating how a display device 11 is mounted to the ceiling 12 of the interior of an automobile so as to allow opening/closing by means of the hinge device 10. As shown in FIG. 14, the bracket 3 of the hinge device 10 is fixed to one member, for example, to the ceiling 12 of the interior of the automobile, and the other member, for example, the display device 11 is fixed to the support shaft portion 1c of the shaft 1. Since the shaft 1 is rotatable with respect to the bracket 3, the display device 11 fixed to the support shaft portion 1c of the shaft 1 can be opened and closed.

Thus, when the display device 11 is opened and closed, the shaft 1 also rotates. Since the braking member 4 and the plate spring member 5 are fitted onto the shaft 1 so as to be non-rotatable but axially movable, the braking member 4 and the plate spring member 5 rotate together with the shaft 1. At this time, the braking member 4 is held in press contact with the bracket 3 by the plate spring member 5, so the braking member 4 rotates while in sliding contact with the bracket 3. Thus, when, during this rotation in the sliding contact state, the protrusions 4a of the braking member 4 are situated in the recessed grooves 3a of the bracket 3, sliding contact of the protrusions 4a of the braking member 4 is avoided due to the recessed grooves 3a, resulting in a low torque. When the protrusions 4a of the braking member 4 are situated on the tapered portions 3b of the recessed grooves 3a of the bracket 3, the torque increases gradually. When the protrusions 4a of the braking member 4 are in sliding contact with the sliding contact surface of the bracket 3, a high torque results.

When, for example, the position where the protrusions 4a of the braking member 4 are situated in the recessed grooves 3a of the bracket 3 corresponds to the position where the display device 11 is accommodated in the ceiling 12 of the vehicle, since the position is in the low torque range, canceling of the lock of the display device 11 causes the display device 11 to start dropping (opening) due to its own weight. FIG. 11 is an exploded view illustrating the state in which the protrusions 4a of the braking member 4 are situated in the recessed grooves 3a of the bracket 3. When, at this time, initial setting is effected with the tapered portions 4c of the protrusions 4a of the braking member 4 being at end edges 3d of the recessed grooves 3a of the bracket 3, there is generated in the braking member 4 a force causing the protrusions 4a to drop into the recessed grooves 3a due to the tapered portions 4c to thereby cause the shaft 1 to rotate. Thus, when the lock of the display device 11 is canceled, the display device 11 springs out as a result of the protrusions 4a of the braking member 4 dropping into the recessed grooves 3a from the end edges 3d of the recessed grooves 3a, thus performing the initial start movement without fail. While this initial setting is not necessary, it is desirable to perform the setting since the setting helps to prevent the display device from failing to drop due to its own weight when the lock is canceled. When the protrusions 4a of the braking member 4 approach the tapered portions 3b of the recessed grooves 3a of the bracket 3, the torque increases gradually, so the dropping (opening) of the display device 11 due to its own weight becomes gradually gentle, until the display device 11 stops. That is, the dropping of the display device 11 due to its own weight is gentle, thus achieving an improvement in terms of quality. FIG. 12 is an exploded view illustrating how the protrusions 4a of the braking member 4 are situated in correspondence with the tapered portions 3b of the recessed grooves 3a of the bracket 3.

When the display device 11 is rotated by hand from this position, where the dropping of the display device due to its own weight has been stopped, the protrusions 4a of the braking member 4 climb onto the sliding contact surface 3c of the bracket 3 from the tapered portions 3b of the bracket 3 to be held in sliding contact therewith, so a high torque is generated, allowing free stop of the display device 11. FIG. 13 is an exploded view illustrating how the protrusions 4a of the braking member 4 are situated in correspondence with the sliding contact surface 3c of the bracket 3. In the hinge device of the present invention, the free stop range is the range for watching the display device 11, so the display device can be stopped through free stopping at an arbitrary angular position where the watching of the display device is possible, thus enabling the passengers in the rear seats to watch the display device always at an optimum angle. In this embodiment, when the display device is further opened to the maximum degree, the lock member 6b of the flat washer 6 is locked to the stopper 3g of the bracket 3, thereby prohibiting further opening. It is not necessary to provide the structure formed by the stopper 3g and the lock member 6b.

FIGS. 15 and 16 are graphs serving as working torque charts for the above operation, of which FIG. 15 shows the case in which initial spring-out setting is not effected, and FIG. 16 shows the case in which initial spring-out setting is effected. According to the torque chart shown in the graph of FIG. 15, at first, the torque due to the weight of the display device is higher than the torque of the hinge device, so the resultant torque is minus, and the display device drops gradually. The two torques coincide with each other at an angle of approximately 30°, and the resultant torque is 0, with the display device stopping. After that, the torque of the display device decreases until attaining an angle of around 90°, whereas the torque of the hinge device increases, and becomes maximum at an angle of around 80°, where the resultant torque is also maximum. As can be well understood from the graph, high torque is maintained thereafter, and free stop of the display device is allowed in this range.

According to the torque chart shown in the graph of FIG. 16, the torque due to the springing-out of the display device is applied to the hinge device, so the resultant torque, which has been a great minus, rapidly approaches 0, and the display device springs out once. After that, the display device gradually drops by its own weight due to the tapered portions, their torques coincide with each other at an angle of approximately 30°, and the resultant torque becomes 0, with the display device stopping. As can be well understood from the graph, an operation similar to that of FIG. 15 is performed thereafter.

In this way, in the hinge device of the present invention, it is possible to cause the self-weight dropping movement of the display device 11 to be reliable and gentle within a fixed range from the start (usually up to approximately 30°). Further, it is possible to cause the display device 11 to spring out as an initial movement through initial setting, so it is possible to prevent the display device 11 from failing to drop under its own weight. Further, since the transition to the free stop range is effected through the tapered portions 3b, it is possible to realize a satisfactory operational feel.

Further, since the top portions of the protrusions 4a of the braking member 4 are formed as the flat portions 4b, it is possible to secure the requisite friction area with respect to the bracket 3, and the frictional force increases, making it possible to generate a large rotational torque. Thus, since a large rotational torque is generated also in the free stop range, there is no fear of the adjusted angle of the display device 11 being deviated from.

As can be understood from the above description, in the hinge device of the present invention, the rotational torque varies according to the area of the recessed grooves 3a of the bracket 3, the tapering angle of the tapered portions 3b, the area of the flat portions 4b at the top of the protrusions 4a of the braking member 4, the tapering angle of the tapered portions 4c, etc., so it is possible to vary the torque characteristics by adjusting those factors. Further, in the hinge device of the present invention, the braking member 4 is held in press contact with the bracket 3 by means of the plate spring member 5. Thus, when the spring force (spring constant) of the plate spring member 5 is changed, the force with which the braking member 4 is held in contact with the bracket 3 is also changed, so the rotational torque also changes. As a result, by changing the plate spring member 5, it is possible to change the torque characteristics.

Next, an opening/closing mechanism according to an embodiment of the present invention will be described. Since the hinge device of the above-mentioned embodiment is used in the opening/closing mechanism of the present invention, the same components will be indicated by the same reference symbols in the following description.

An opening/closing mechanism according to the present invention includes: a plurality of hinge devices each of which is composed of the bracket 3 which is fixed to one member, for example, the ceiling of the interior of an automobile; the shaft 1 which is rotatably attached to the bracket 3 and to which the other member, for example, a display device, is fixed; the braking member 4 which is attached to the shaft 1 so as to be non-rotatable but axially movable and which is in sliding contact with the bracket 3 and adapted to rotate relative to the same; and the plate spring member 5 which is attached to the shaft 1 so as to be non-rotatable but axially movable and which holds the braking member 4 in press contact with the bracket 3. The surface of the bracket 3 held in sliding contact with the braking member 4 is provided with the recessed grooves 3a one end portion of each of which is formed as the tapered portion 3b. The surface of the braking member 4 held in sliding contact with the bracket 3 is provided with the protrusions 4a coming into sliding contact with the sliding contact surface 3c, the recessed grooves 3a, and the tapered portions 3b of the bracket. The top portion of each of the protrusion 4a is formed as a flat portion 4b, and both end portions thereof, which are continuous with the flat portion 4b, are formed as tapered portions 4c. The respective plate spring members 5 of the plurality of hinge devices have different spring constants. In the hinge devices, one member (e.g., ceiling of an automobile) and another member (e.g., display device) are connected so as to allow opening and closing. Otherwise, the hinge device is of the same construction as that of the above-mentioned embodiment.

Since their respective plate members 5 have different spring constants, the hinge devices generate different rotational torques. Thus, by using a plurality of hinge devices so as to be in conformity with the torque as required by the opening/closing member used, it is possible to attain an optimum rotational torque.

For example, by using two hinge devices, a display device is connected to the ceiling of an automobile so as to allow opening and closing, with the plate spring member 5 of one hinge device having a low spring constant and that of the other hinge device having a high spring constant. In this case, in the self-weight dropping range for the display device, the hinge device whose plate spring member 5 has a low spring constant is caused to operate. In the free stopping range, the hinge device whose plate spring member 5 has a high spring constant is caused to operate. As a result, the movement in the self-weight dropping range can be made gentle, and the stopping in the free stopping range can be effected reliably by attaining high torque. In this way, through role sharing between two hinge devices, it is possible to attain a rotational torque suitable for the opening/closing member. In the case of the above-mentioned display device, the role sharing between two hinge devices is effected as follows. In one hinge device, the plate spring member 5B(5) of low spring constant is used to attain smooth stopping at the time of self-weight dropping (self-weight opening) of the display device 11. In the other hinge device, the plate spring member 5A(5) of high spring constant is used to generate the requisite large torque when the display is to be watched.

An example of the construction will be described. In one hinge device using the plate spring member 5B(5) of low spring constant, the tapering angle of the tapered portions 3b of the recessed grooves 3a of the bracket 3 is gentle (e.g., 4.5°). In the other hinge device using the plate spring member 5A(5) of high spring constant, the tapering angle of the tapered portions 3b of the recessed grooves 3a of the bracket 3 is steep (e.g., 6.5°). At the time of self-weight dropping of the display device, the protrusions 4a of the braking member 4 of one hinge device come into sliding contact with the tapered portions 3b of the bracket 3 to operate sooner than those of the other hinge device, thus mainly serving to effect smooth stopping. After that, the protrusions 4a of the braking member 4 of the other hinge device come into sliding contact with the steep tapered portions 3b of the bracket 3 and reach the sliding contact surface 3c of the bracket 3 to generate high torque, thus mainly serving to generate the torque as required at the time of watching the display. This is possible because the tapered portions of a steep tapering angle of the bracket 3 can attain the same height through a shorter distance, and effect rearward positional deviation as compared with the tapered portions of a gentle tapering angle.

The above-mentioned embodiments do not restrict the present invention but allow various modifications without departing from the gist of the present invention. For example, regarding the layout, when it is necessary for the display device or the opening/closing member such as the cover, to be sprung up for the purpose of opening/closing, initial setting may be effected on the protrusions 4*a* of the braking member 4 in the state in which the protrusions 4*a* have been dropped in the recessed grooves 3*a* of the bracket 3. Since sliding contact of the protrusions 4*a* of the braking member 4 is avoided by virtue of the recessed grooves 3*a*, it is possible to reduce the frictional force at the time of springing up. Further, initial positioning may be effected on the tapered portions 4*c* of the protrusions 4*a* of the braking member 4 in the sate in which they have climbed onto the end edges 3*d* of the recessed grooves 3*a* of the bracket 3. This proves effective since the springing-up and opening is effected by the force exerted when the protrusions 4*a* of the braking member 4 drop into the recessed grooves 3*a* from the end edges 3*d* of the recessed grooves 3*a*.

Examples of a device effecting opening/closing of an opening/closing member through springing-up thereof include a personal computer, a car navigation apparatus, a console box, and various display devices. Next, an example in which the present invention is applied to such a device in which the opening/closing of the opening/closing member is effected through springing-up will be described.

FIG. 20 is a schematic view illustrating how a display device is mounted to an apparatus main body to be used in a flat state so as to be capable of opening and closing in a rising direction by means of a hinge device. In this example, the display device 11 is provided on a cover, and the cover on which the display device 11 is provided is connected to an apparatus main body 13 by means of the hinge device 10 so as to be capable of springing up and rising from the horizontal accommodated state, making it possible to open, close, stop, and retain the display device at an angle allowing easy watching.

FIGS. 17 through 19 show an embodiment of a hinge device applicable to such a case. FIG. 17 is a front view, FIG. 18 is a perspective view, and FIG. 19 is an exploded perspective view thereof. The same components as those of the above-mentioned embodiments are indicated by the same reference numerals, and a detailed description thereof will be omitted.

A frame 14 to be fixed to one member, for example, the apparatus main body 13, has both end portions thereof formed as raised bearing plates 15 and 16. As described above, in constructing the hinge device 10, the friction plate 2, the bracket 3, the braking member 4, the plate spring member 5, and the flat washer 6 are fitted in the stated order onto the main shaft portion 1*b* of the shaft 1 and pressed against the flange 1*a* of the shaft 1, with the end portion of the main shaft portion 1*b* being swaged for detachment prevention. At this time, the plate spring member 5 is swaged while being deflected, that is, while holding the braking member 4 in press contact with the bracket 3. The bracket 3 of the hinge device 10 is fixed to the frame 14, and the support shaft portion 1*c* of the shaft 1 is rotatably supported by one bearing plate 15 of the frame 14. The support shaft portion 1*c* of the shaft 1 extends through one bearing plate 15 to protrude therefrom.

A torsion spring 17 is attached to the portion of the support shaft portion 1*c* of the shaft 1 between the bracket 3 and one bearing plate 15. One end 17*a* of the torsion spring 17 is locked to a lock member 18*a* of a lock member 18 fitted onto the support shaft portion 1*c* of the shaft 1 so as to be non-rotatable, and the other end 17*b* thereof is inserted into a lock hole 19 of the bracket 3 to be thereby locked, imparting torque to the shaft 1 and urging the display device 11 in the opening direction.

The lock member 18 is provided with a non-circular hole 18*b* corresponding to the non-circular configuration of the support shaft portion 1*c* of the shaft 1, and is made non-rotatable by being mounted to the support shaft portion 1*c* of the shaft 1 through insertion of the support shaft portion 1*c* of the shaft 1 into the non-circular hole 18*b*. In this embodiment, the support shaft portion 1*c* of the shaft 1 is of a W-D configuration, and the lock member 18 has the non-circular hole 18*b* corresponding thereto.

On the other hand, the other member, for example, a mounting member 20, to which the display device 11 is mounted, has at one end and the other end thereof a left-hand side arm 21 and a right-hand side arm 22. The proximal end portion of the left-hand side arm 21 is mounted to the portion of the support shaft portion 1*c* of the shaft 1 protruding from the bearing plate 15 so as to be non-rotatable, and is prevented from being detached by means of an E-ring 23 through the intermediation of a washer 25. That is, the left-hand side arm 21 is provided with a non-circular hole 21*a* corresponding to the non-circular sectional configuration of the support shaft portion 1*c* of the shaft 1, and is made non-rotatable by being mounted to the support shaft portion 1*c* of the shaft 1 through insertion of the support shaft portion 1*c* of the shaft 1 into the non-circular hole 21*a*. In this embodiment, the support shaft portion 1*c* of the shaft 1 is of a W-D configuration, and the left-hand side arm 21 has the non-circular hole 21*a* corresponding thereto. Thus, the left-hand side arm 21 rotates together with the shaft 1. In this embodiment, the washer 25 is provided between the lock member 18 and the bearing plate 15 and between the bearing plate 15 and the left-hand side arm 21.

The proximal end portion of the right-hand side arm 22 is rotatably mounted to the other bearing plate 16 of the frame 14 by means of a pin 24, and is prevented from being detached by means of an E-ring 23 through the intermediation of the washer 25. That is, the pin 24 mounted to the other bearing plate 16 has a circular sectional configuration, and the right-hand side arm 22 is provided with a circular hole 22*a* corresponding to the circular sectional configuration of the pin 24. The right-hand side arm 22 is mounted through insertion of the pin 24 into the circular hole 22*a*, and is prevented from detachment by the E-ring 23 while being rotatable.

Thus, the left-hand side arm 21 of the mounting member 20 is mounted to the support shaft portion 1*c* of the shaft 1 so as to be non-rotatable, and the right-hand side arm 22 thereof is mounted rotatably to the other bearing plate 16 by means of the pin 24, so the mounting member 20 rotates (opens and closes) together with the rotation of the shaft 1.

Thus, as shown in FIG. 20, when the frame 14 is fixed to the apparatus main body 13 which constitutes one member, and the display device 11 is mounted to the mounting member 20 which constitutes the other member, the following operation is preformed. First, described is the operation in a case in which initial setting is effected with the protrusions 4*a* of the braking member of the hinge device 10 dropped in the recessed grooves 3*a* of the bracket 3.

First, when, with the display device 11 being accommodated in the apparatus main body 13, the lock of the display device 11 is canceled, sliding contact of the protrusions 4a of the braking member 4 is avoided at first by virtue of the recessed grooves 3a of the bracket 3. As a result, due to the spring force (urging force) of the torsion spring 17, which is in excess of the minus resultant torque due to the resultant torque of the hinge device 10 and the display device 11, the display device 11 once springs out abruptly to open by a dimension H1. After that, the display device 11 continues to open due to the urging force of the torsion spring 17. When the protrusions 4a of the braking member 4 approach the tapered portions 3b of the recessed grooves 3a of the bracket 3, the torque increases gradually, so the opening of the display device 11 becomes gradually gentle, until the display device 11 stops (section H2). That is, while springing out and moving quickly at first, the display device 11 moves thereafter gently, thus providing a satisfactory quality. When the display device 11 is rotated in the opening direction by hand from the position where the opening by the urging force of the torsion spring 17 has stopped, the protrusions 4a of the braking member 4 climb onto the sliding contact surface 3c of the bracket 3 from the tapered portions 3b of the bracket 3 to come into sliding contact therewith. As a result, high torque is generated, enabling the display device 11 to make free stop (section H3).

FIG. 21 is a torque chart illustrating the above-mentioned operation. According to the torque chart of FIG. 21, at first, the protrusions 4a of the braking member 4 drop into the recessed grooves 3a of the bracket 3 to avoid sliding contact, so the display device once springs out abruptly due to the spring force (urging force) of the torsion spring 17. After that, however, the rotational torque of the hinge device 10 increases gradually due to the tapered portions 3b, so the display device 11 opens gradually gently, and the torque of the torsion spring 17 coincides with the weight of the display device 11 and the torque of the hinge device 10 at an angle of approximately 30°, and the resultant torque is 0, with the display device 11 stopping. After that, from the point of around 30°, the rotational torque of the hinge device 10 becomes larger than the spring force of the torsion spring 17, and the rotational torque due to the weight of the display device 11 decreases to a point of around 90°. Accordingly, the resultant torque also gradually increases to a point of around 90°, where it is maximum, and the resultant torque is maintained at a level higher than the spring force of the torsion spring 17 beyond a point of around 60°. As a result, as can be well understood, in this range, the display device 11 is capable of free stopping.

Next, described is the operation in a case in which initial setting is effected with the tapered portions 4c of the protrusions 4a of the braking member 4 of the hinge device 10 being on the end edges 3d of the recessed grooves 3a of the bracket 3.

In this case, when the lock of the display device 11 is canceled in the state in which the display device 11 is accommodated in the apparatus main body 13 as shown in FIG. 20, the display device 11 springs out due to the resultant force of the force exerted when the protrusions 4a of the braking member 4 drop into the recessed grooves 3a from the end edges 3d of the recessed grooves 3a of the bracket 3 due to the tapered portions 4c and of the spring force (urging force) of the torsion spring 17. After that, the display device 11 continues to open due to the urging force of the torsion spring 17. When the protrusions 4a of the braking member 4 approach the tapered portions 3b of the recessed grooves 3a of the bracket 3, the torque increases gradually, so the opening of the display device 11 becomes gradually gentle, until the display device 11 stops. That is, while springing out and moving quickly at the first stage of its opening, the display device 11 moves gently thereafter, thus providing a satisfactory quality. When the display device 11 is rotated by hand in the opening direction from the position where its opening due to the urging force of the torsion spring 17 has been stopped, the protrusions 4a of the braking member 4 climb onto the sliding contact surface 3c of the bracket 3 from the tapered portions 3b of the bracket 3 to come into sliding contact therewith. As a result, high torque is generated, allowing the display device 11 to make free stop.

In the case in which initial setting is effected with the tapered portions 4c of the protrusions 4a of the braking member 4 of the hinge device 10 being on the end edges 3d of the recessed grooves 3a of the bracket 3, when the lock of the display device 11 is canceled, there is exerted, apart from the spring force (urging force) of the torsion spring 17, the force exerted when the protrusions 4a of the braking member 4 drop into the recessed grooves 3a of the bracket 3. As a result, the springing-out (opening) of the display device 11 is effected more reliably, and it is possible to reliably prevent the display device 11 from failing to open when the lock is canceled.

In this way, also in a case in which the display device 11 is opened by raising the same, for example, from the horizontal position, in the hinge device 10, the free stop range is the range where the operation and watching of the display device 11 is effected at an arbitrary angular position. As a result, the operation and watching can be effected at an optimum angle.

When opening the conventional display device using a torsion spring, the display device is opened from the start to a stop angle, where the display device is abruptly decelerated by a stopper or the like. As a result, the display device undergoes vibration when stopping, which leads to a lack of quality. In the present invention, while the display device moves quickly at first, the movement of the display device becomes gradually gentle, until the display device stops, thus providing a satisfactory quality.

Further, due to the spring force of the torsion spring 17, which at first exceeds the minus resultant torque due to the hinge device and the display device, the display device 11 opens without fail when the lock is canceled.

In particular, when initial setting is effected with the tapered portions 4c of the protrusions 4a of the braking member 4 being on the end edges 3d of the recessed grooves 3a of the bracket 3, the display device springs out due to the resultant force of the force exerted when the protrusions 4a of the braking member 4 drop into the recessed grooves 3a from the end edges 3d of the recessed grooves 3a of the bracket due to the tapered portions 4c and of the spring force (urging force) of the torsion spring 17. As a result, the display device 11 opens without fail when the lock is canceled.

Further, when initial setting is effected with the protrusions 4a of the braking member 4 dropped in the recessed grooves 3a of the bracket 3, sliding contact of the protrusions 4a of the braking member 4 is avoided by virtue of the recessed grooves 3a of the bracket 3. As a result, it is possible to reduce the frictional force at the time of springing up, enabling to reduce the spring-up torque of the torsion spring 17, therebyvhelping to achieve a reduction in size. Further, when initial setting is effected with the tapered portions 4c of the protrusions 4a of the braking member 4 being on the end edges 3d of the recessed grooves 3a of the bracket 3, the springing-out occurs with the force exerted when the protrusions 4a of the braking member 4 drop into the recessed grooves 3a from the end edges 3d of the recessed grooves 3a.

As a result, it is possible to further reduce the spring-up torque of the torsion spring 17, thereby achieving a further reduction in size.

Further, the setting of the opening angle can be changed according to the angle of the tapered portions 3b of the recessed grooves 3a of the bracket 3.

Further, the conventional device using a torsion spring alone has such problems in that the display device (cover) is allowed to open completely, that the display device lacks stability in opening, or that the display device fails to open, thus lacking the requisite quality feel and involving a deterioration in operational feel. The present invention involves no such problems, and provides a satisfactory operational feel and helps to achieve an improvement in quality.

Further, it is possible to reduce the torque of the torsion spring 17. As a result, generation of torsion and warpage can be suppressed when the display device (cover) 11 is opened/closed, thereby stabilizing the operation and attaining high quality.

When using the display device in the horizontal state, it is possible to perform a supporting operation in which the heaviest portion of a console box cover or the like is opened with the resultant force of the spring force of the torsion spring 17 and the torque of the hinge device, causing the cover to make free stopping at an arbitrary position afterwards.

INDUSTRIAL APPLICABILITY

The hinge device of the present invention is suitable as a hinge device connecting one member and another member so as to allow opening and closing and capable of effecting springing-out at the time of lock canceling and effecting opening/closing, stopping, and retaining at an angle allowing easy watching. Apart from this, the hinge device is applicable to a small OA apparatus such as a notebook computer or a mobile phone, a portable terminal apparatus, and a hinge device for connecting a toilet seat main body, a toilet seat, and a cover.

Figure 1:
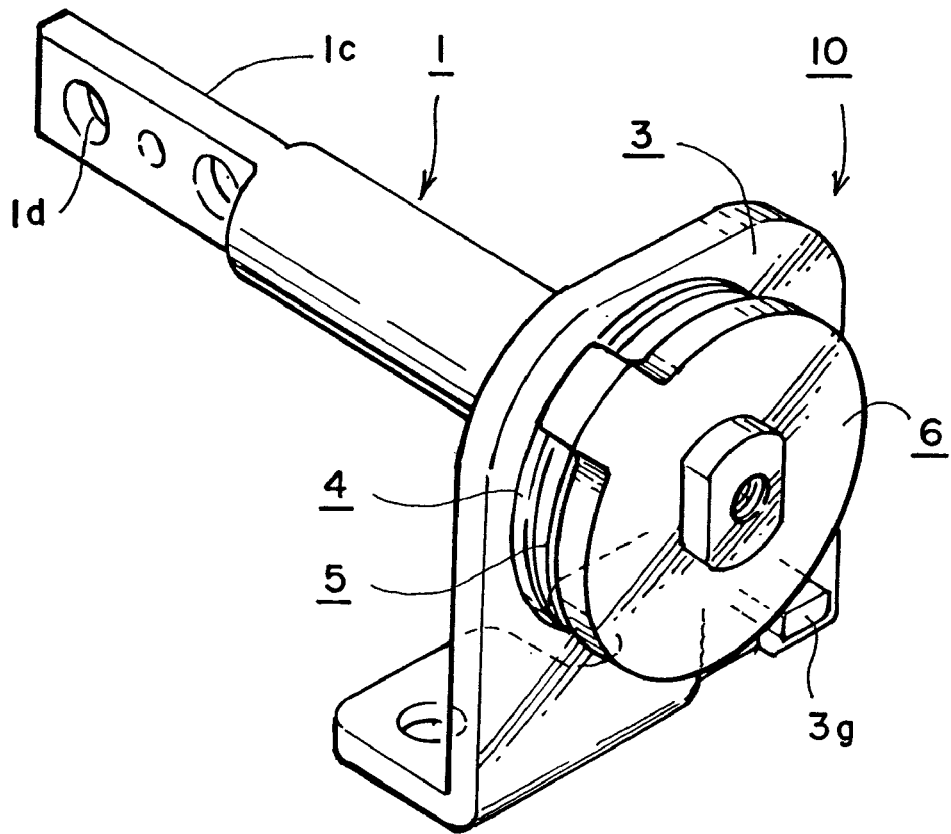
FIG. 1 is a perspective view of a hinge device according to an embodiment of the present invention.
Figure 2:
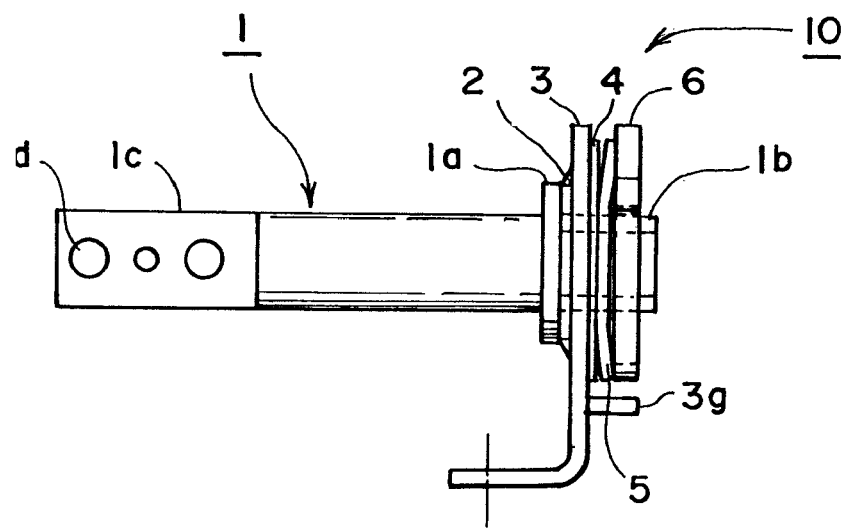
FIG. 2 is a front view of a hinge device according to an embodiment of the present invention.
Figure 3:
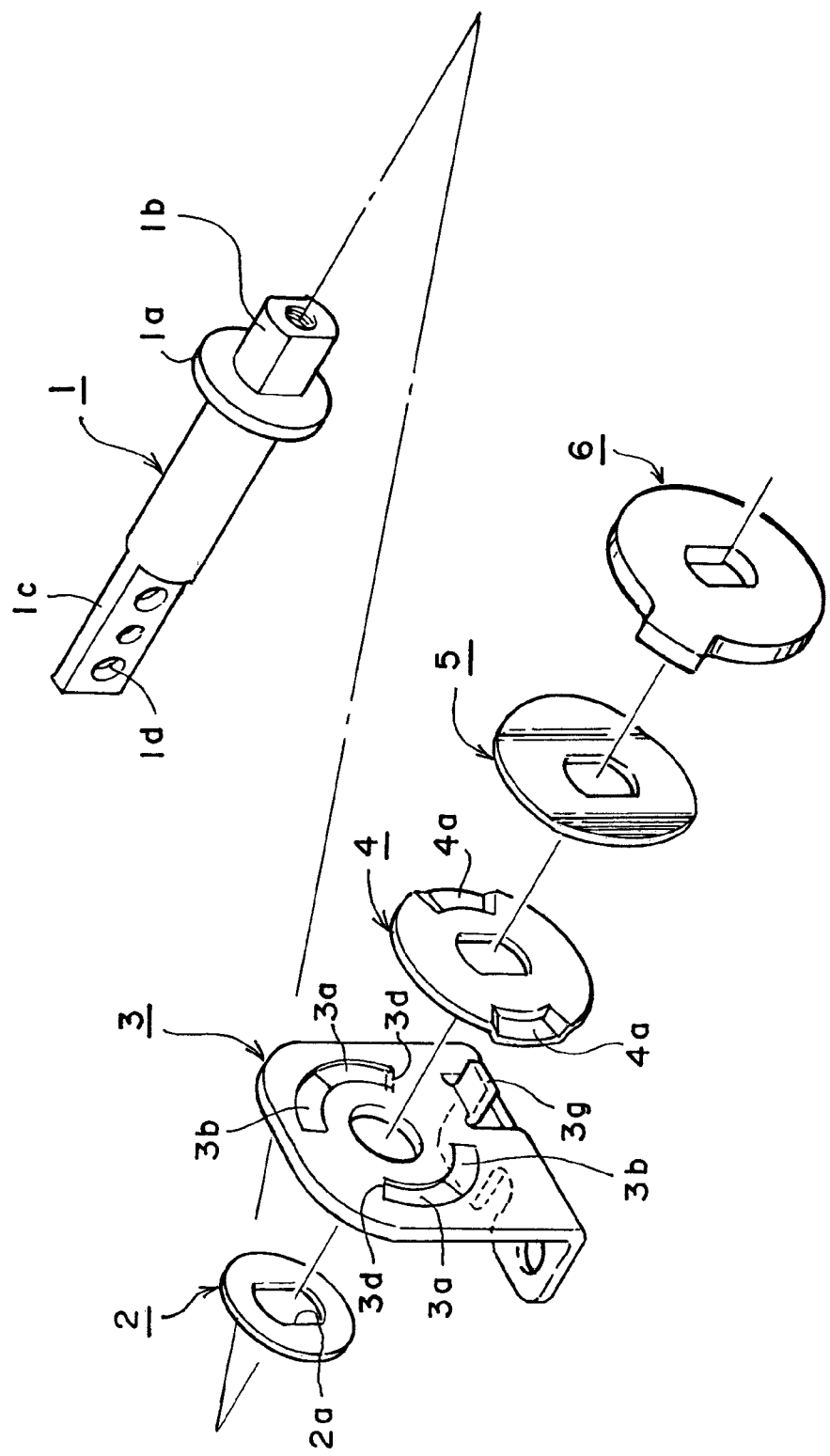
FIG. 3 is an exploded perspective view of a hinge device according to an embodiment of the present invention.
Figure 4:
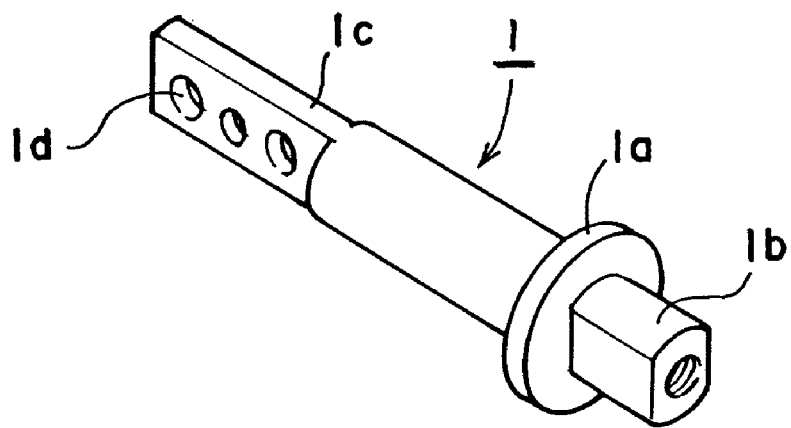
FIG. 4(a) is a perspective view.
FIG. 4(b) is a front view of a shaft.
Figure 4:
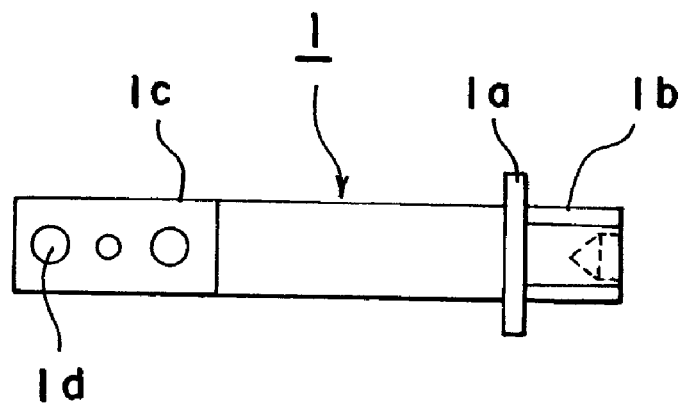
Figure 5:
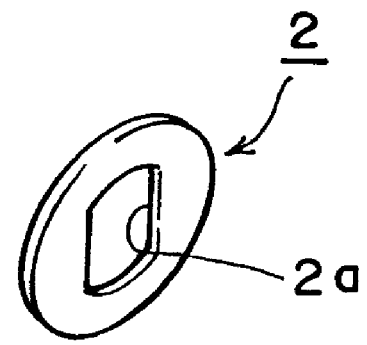
FIG. 5(a) is a perspective view.
FIG. 5(b) is a side view of a friction plate.
Figure 5:
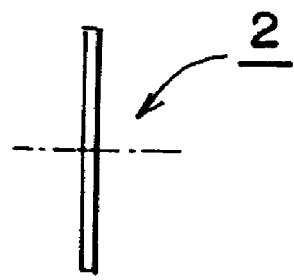
Figure 6:
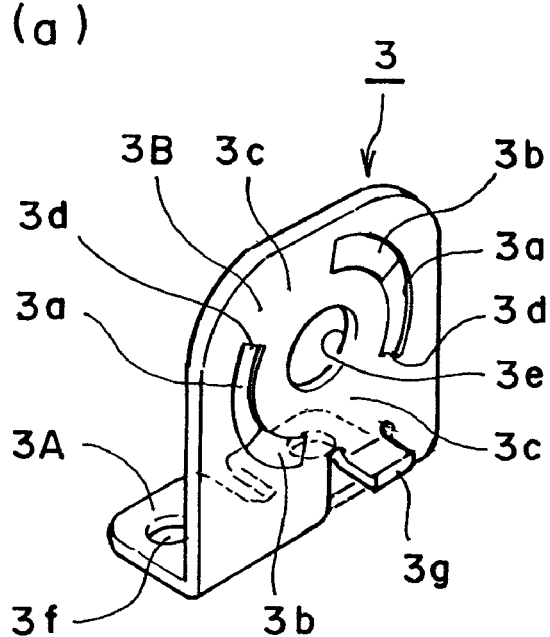
FIG. 6(a) is a perspective view.
FIG. 6(b) is a front view of a bracket.
Figure 6:
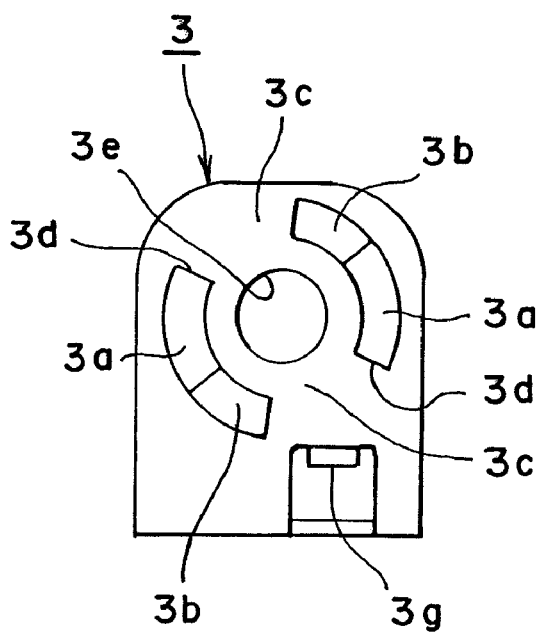
Figure 7:
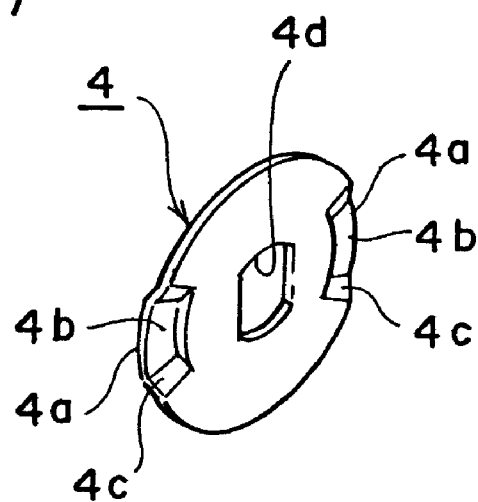
FIG. 7(a) is a perspective view.
FIG. 7(b) is a front view of a braking member.
Figure 7:
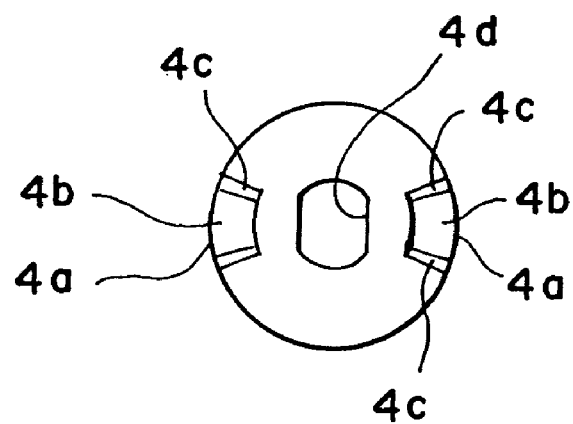
Figure 8:
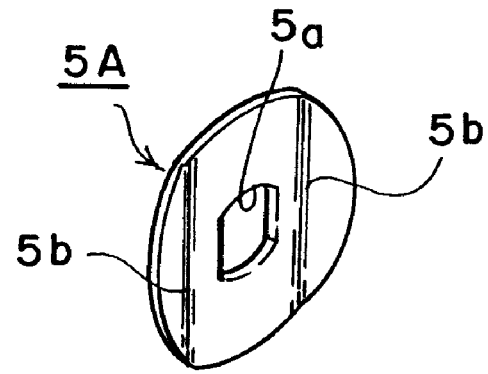
FIG. 8(a) is a perspective view.
FIG. 8(b) is a plan view.
FIG. 8(c) is a front view of a plate spring member.
Figure 8:
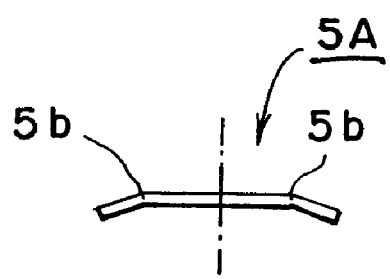
Figure 8:
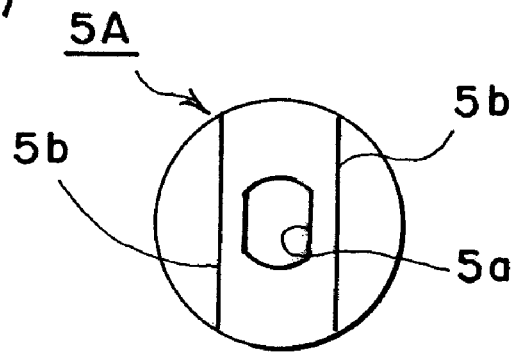
Figure 9:
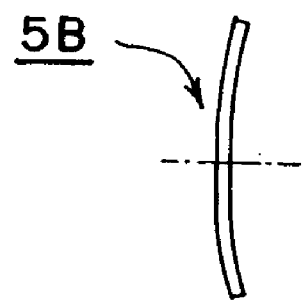
FIG. 9(a) is a side view.
FIG. 9(b) is a front view of another plate spring member.
Figure 9:
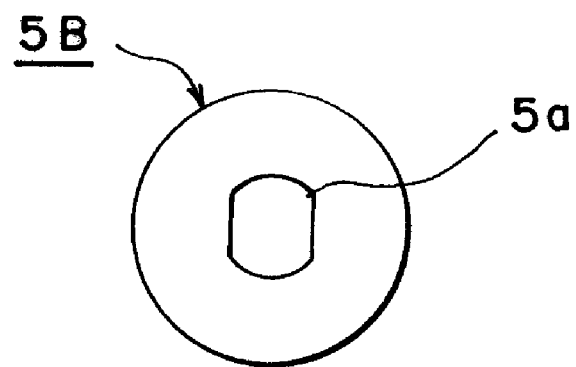
Figure 10:
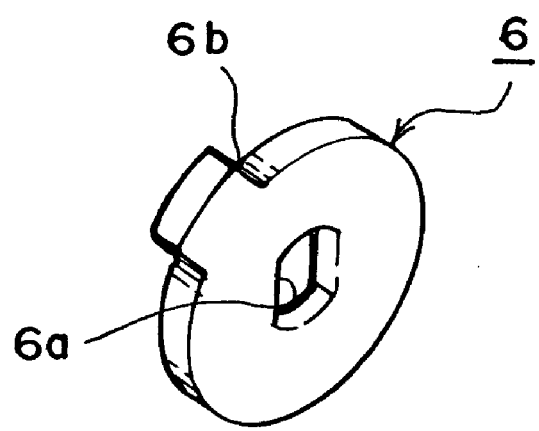
FIG. 10(a) is a perspective view.
FIG. 10(b) is a side view (b) of a flat washer.
Figure 10:
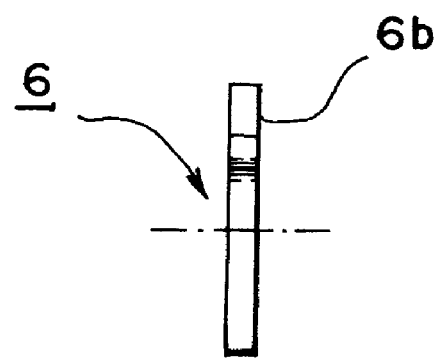
Figure 11:
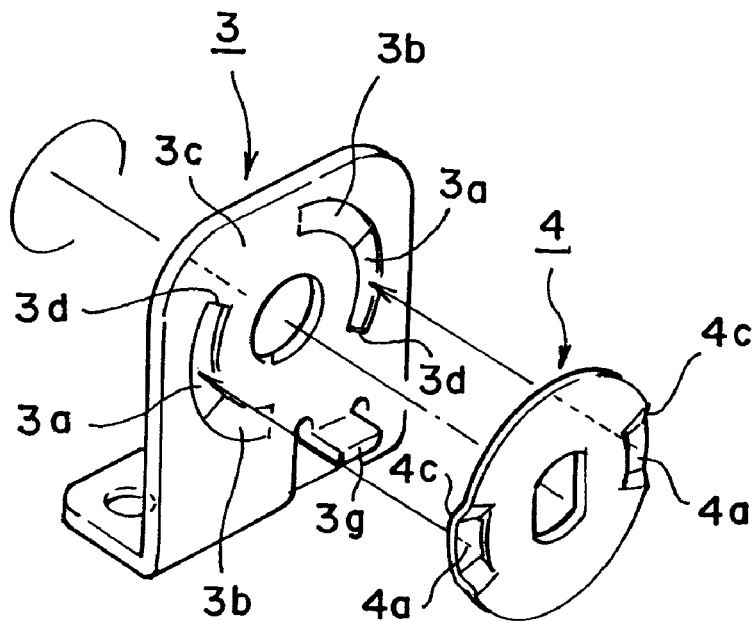
FIG. 11 is an exploded perspective view illustrating how protrusions of a braking member are situated in recessed grooves of a bracket.
Figure 12:
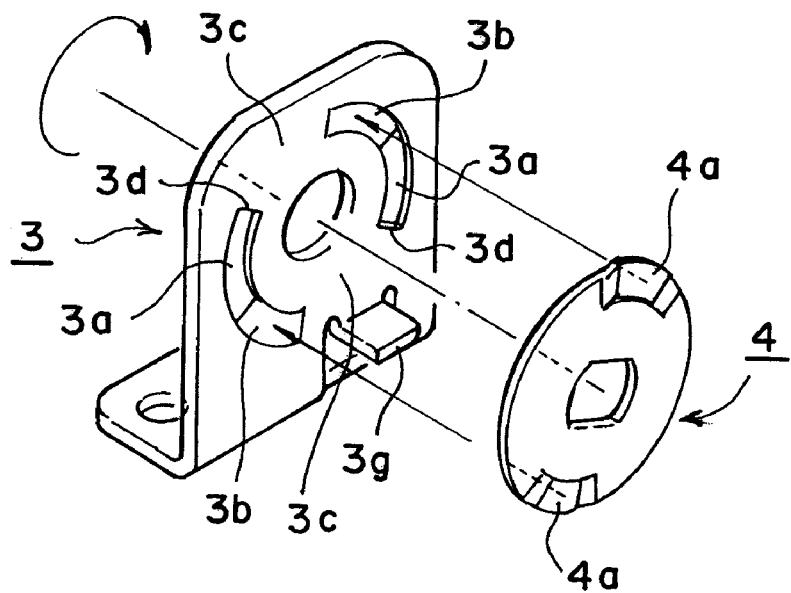
FIG. 12 is an exploded perspective view illustrating how the protrusions of the braking member are situated on tapered portions of the bracket.
Figure 13:
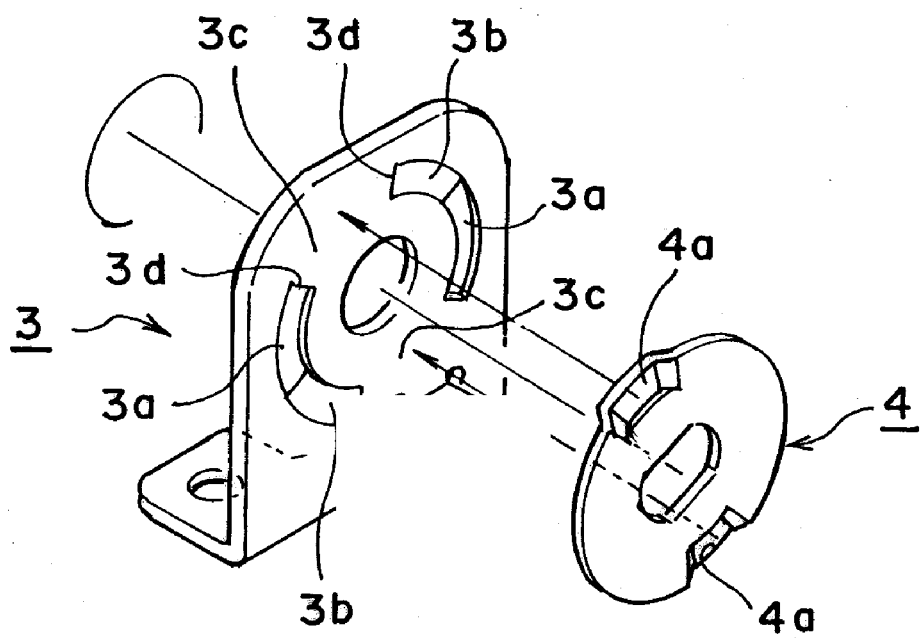
FIG. 13 is an exploded perspective view illustrating how the protrusions of the braking member are situated on a sliding contact surface of the bracket.
Figure 14:
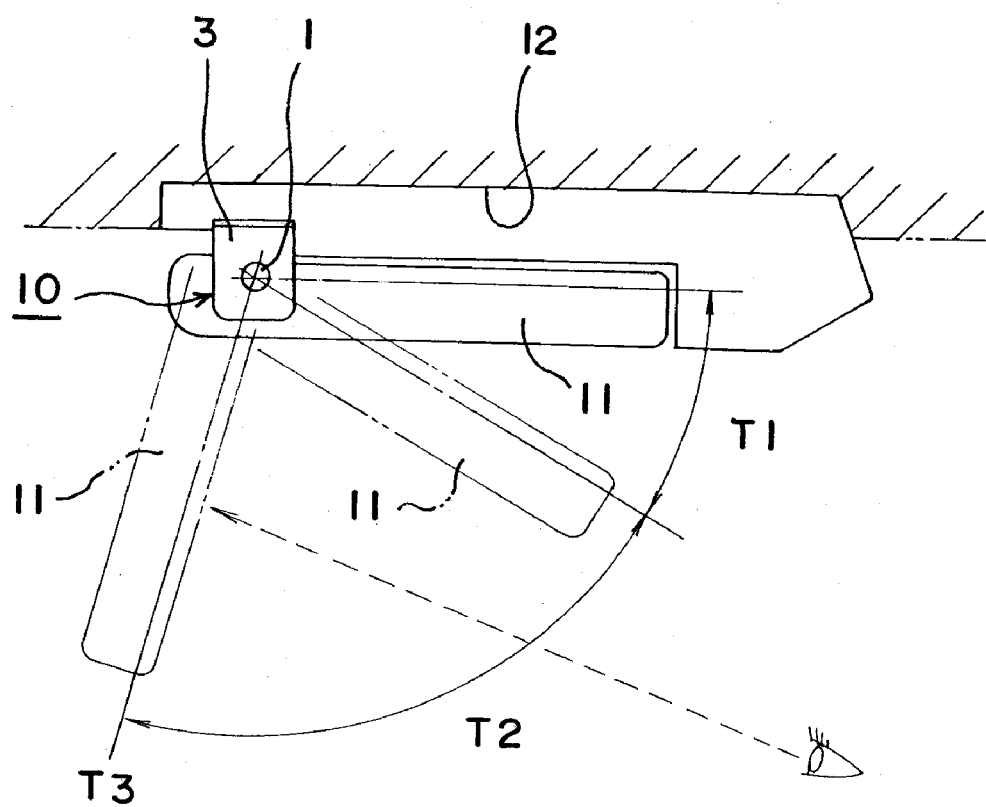
FIG. 14 is a schematic view showing how a display device is mounted to the ceiling of the interior of an automobile so as to allow opening/closing by means of a hinge device.
Figure 15:
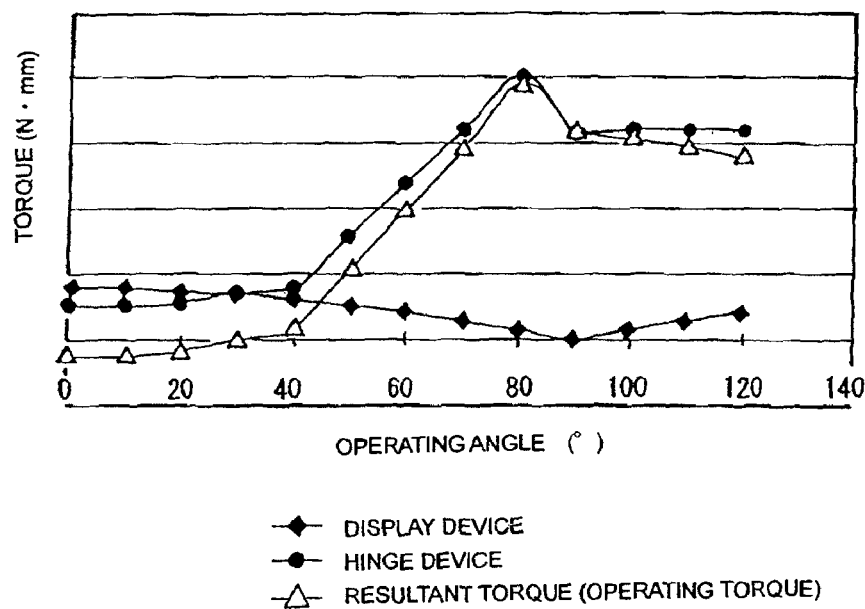
FIG. 15 is a graph serving as a torque chart for the hinge device of the present invention.
Figure 16:
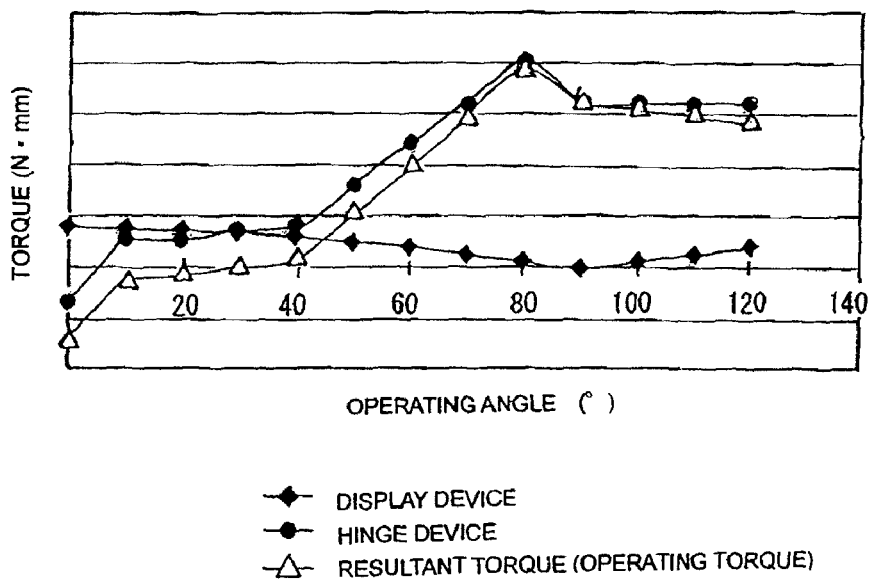
FIG. 16 is a graph serving as a torque chart for a case in which initial setting for springing-out is effected in the hinge device of the present invention.
Figure 17:
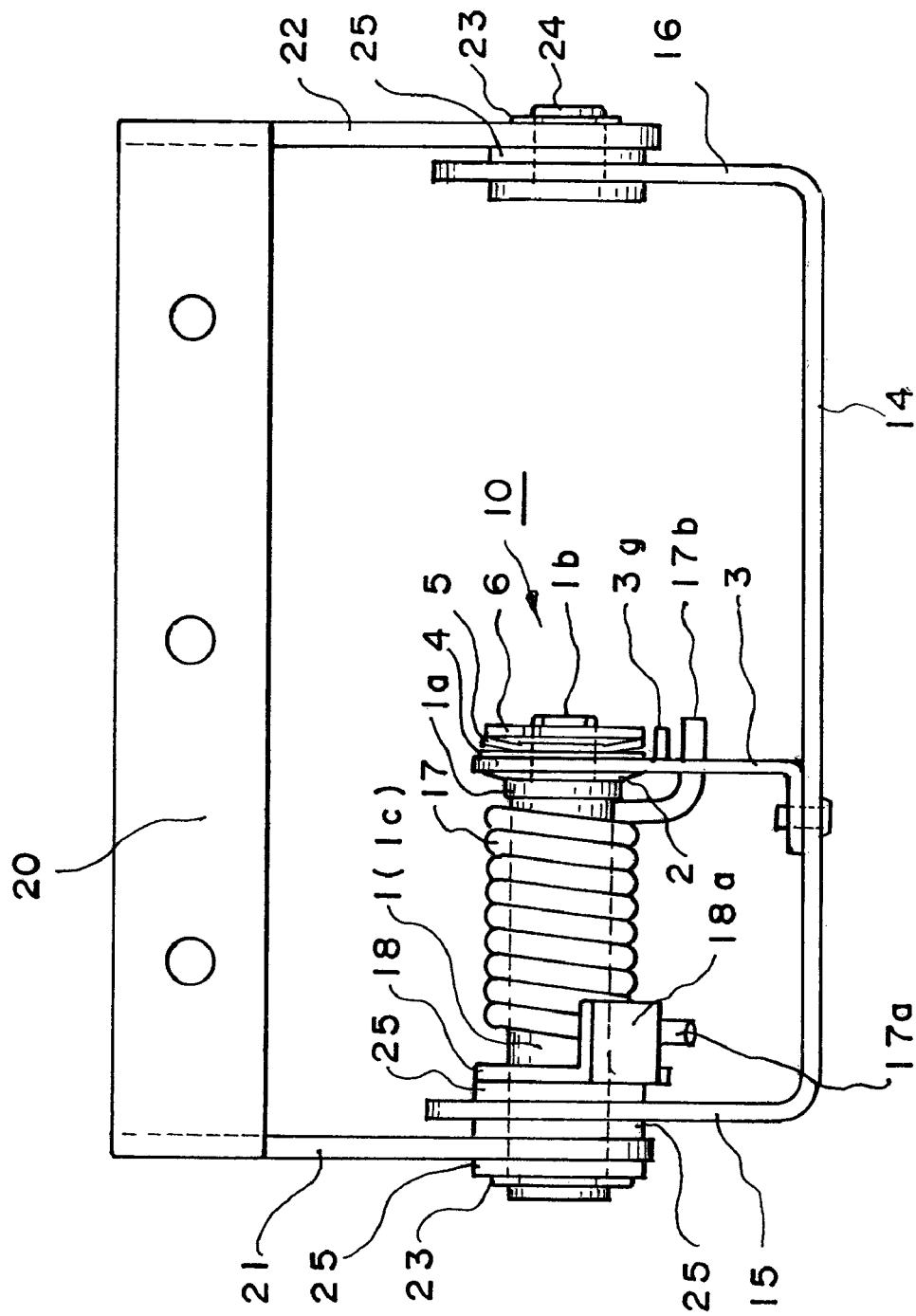
FIG. 17 is a front view of another embodiment of the present invention.
Figure 18:
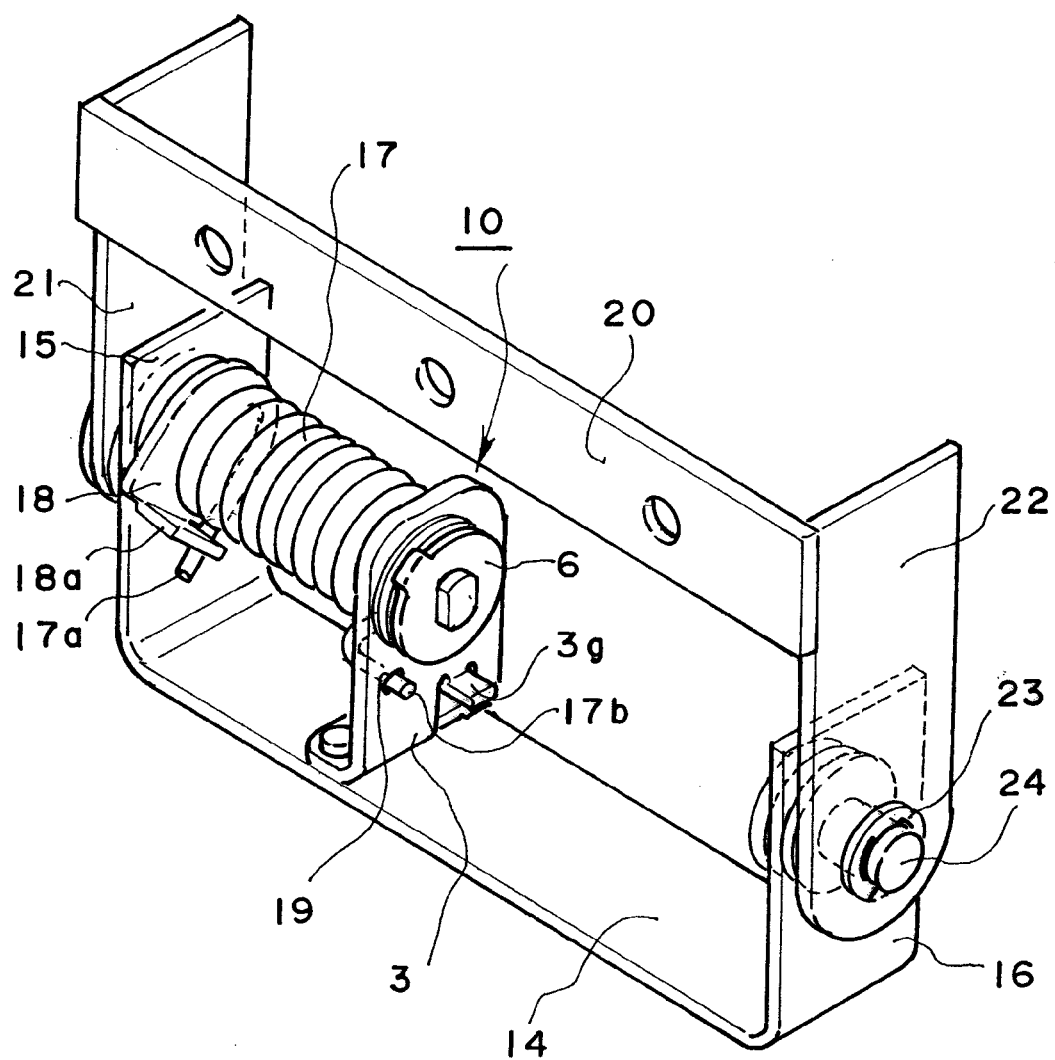
FIG. 18 is a perspective view of another embodiment of the present invention.
Figure 19:
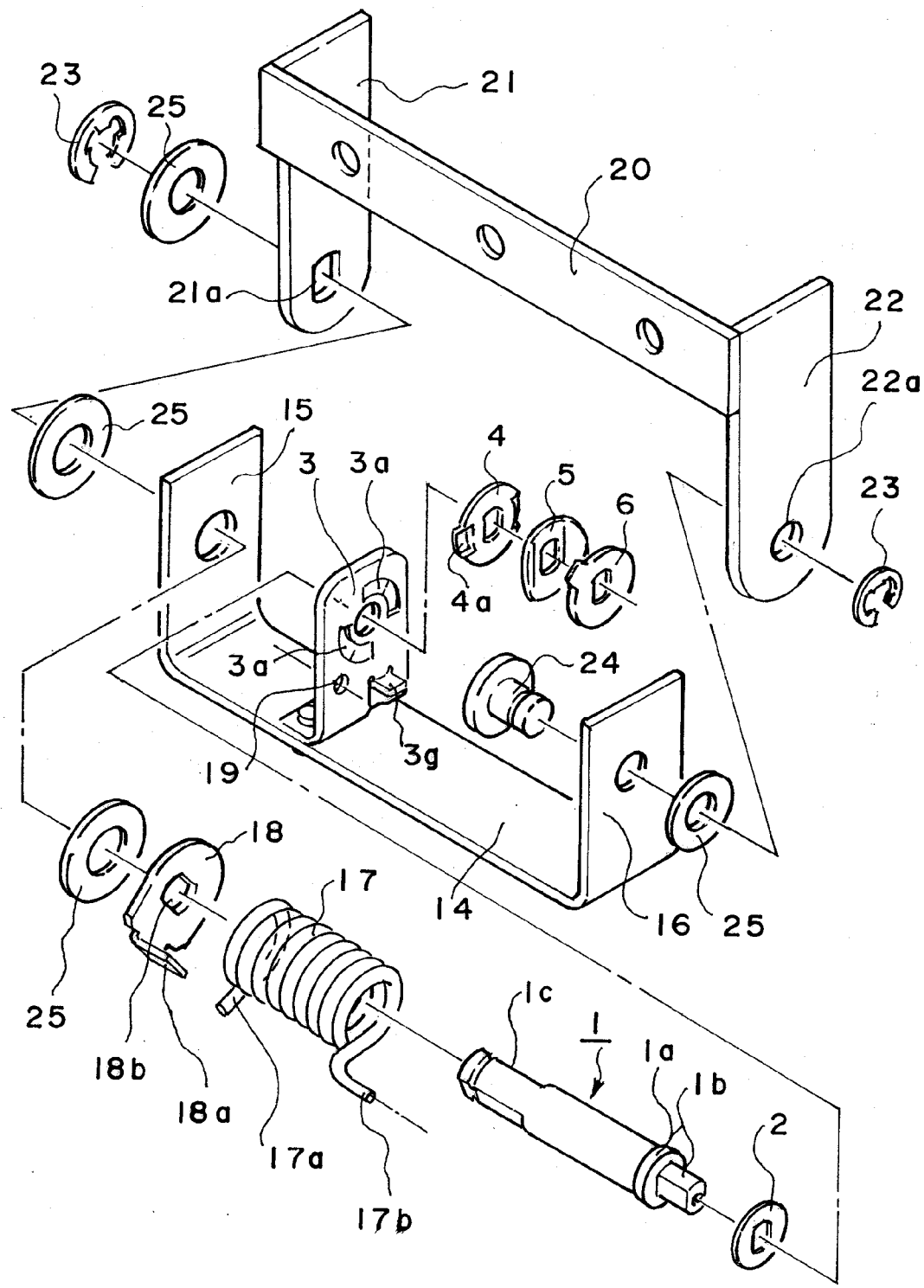
FIG. 19 is an exploded perspective view of another embodiment of the present invention.
Figure 20:
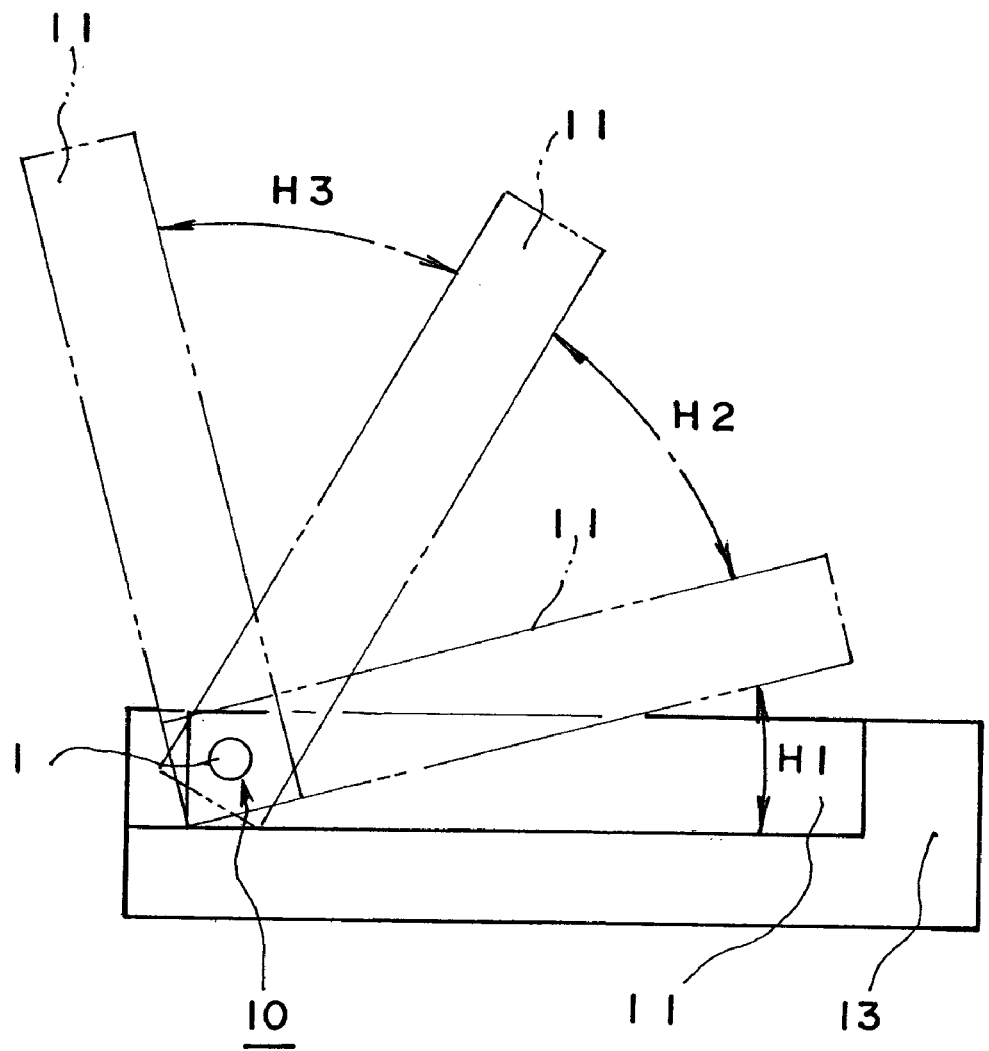
FIG. 20 is a schematic view illustrating how a display device is mounted, so as to be capable of opening/closing in a rising direction, to a device main body to be used in a flat state.
Figure 21:
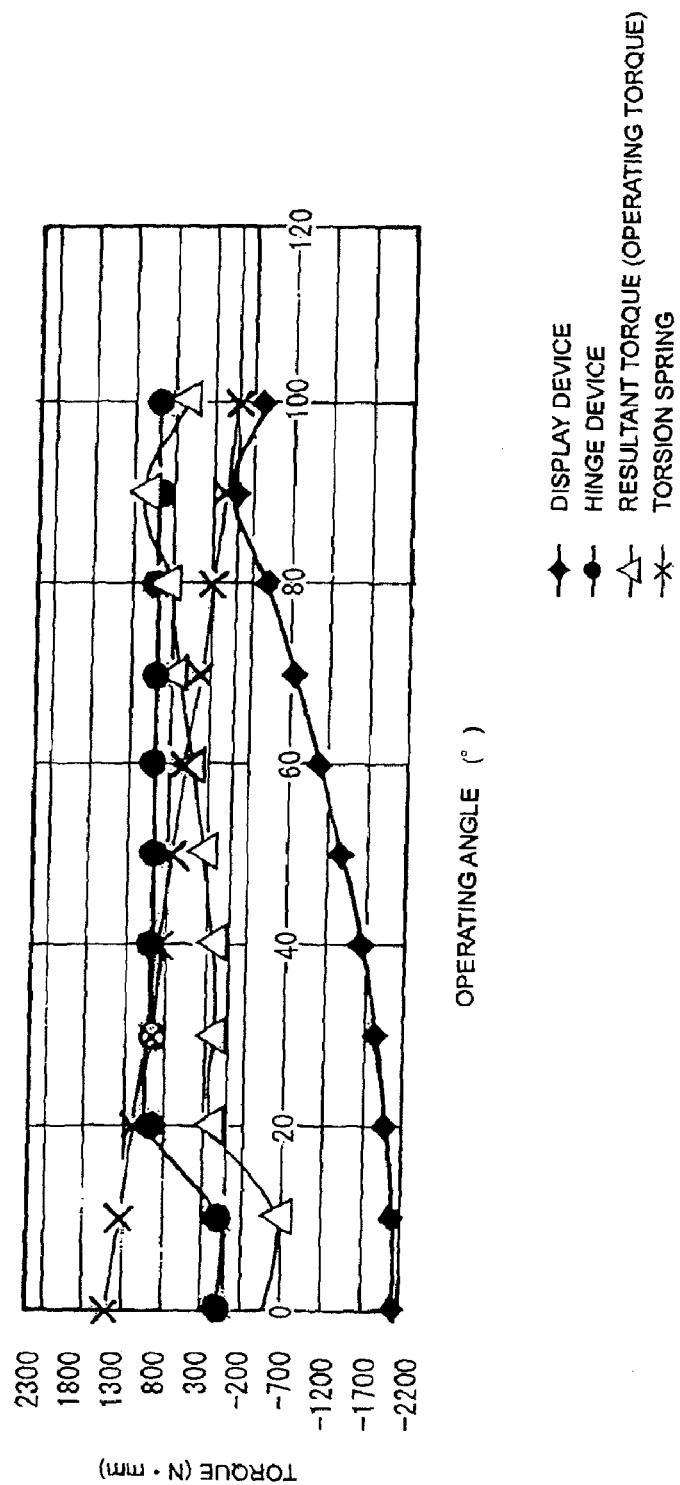
FIG. 21 is a graph serving as a torque chart for a device according to another embodiment of the present invention.

DESCRIPTION OF REFERENCE SYMBOLS 1 shaft
1a flange portion
1b main shaft portion
1c support shaft portion
2 friction plate
3 bracket
3a recessed groove
3b tapered portion
3c sliding contact surface
3d end edge
3g stopper
3a horizontal portion
3b vertical portion
4 braking member
4a protrusion
4b top portion of flat portion
4c tapered portion
5 plate spring member
5A, 5B plate spring member
5b bent portion
6 flat washer
6b lock member
10 hinge device
11 display device
12 ceiling of interior of automobile
13 apparatus main body
14 frame
15 one bearing plate
16 other bearing plate
17 torsion spring
17a one end of torsion spring
17b other end of torsion spring
18 lock member
18a lock member
18b non-circular hole
20 mounting member
21 left-hand side arm
21a non-circular hole
22 right-hand side arm
22a circular hole
23 E-ring
24 pin
25 washer

The invention claimed is:

1. A hinge device for connecting one member and another member so that the one member and the other member can open and close, the hinge device comprising:
a bracket fixed to one member;
a shaft rotatably attached to the bracket and fixed to another member;
a braking member attached to the shaft, said braking member being fixed to said shaft and said braking member being rotatable with said shaft, said braking member being movable in an axial direction, said braking member being held in sliding contact with the bracket, said braking member comprising a first protrusion and a second protrusion, said first protrusion being point symmetrical to said second protrusion; and
a plate spring member attached to the shaft, said plate spring not being rotatable with respect to said shaft, said plate spring member being movable in said axial direction, said braking member being in press contact with the bracket via said plate spring member, said bracket having a first flat sliding contact surface, a first bottom tapered surface, a second flat sliding contact surface and a second bottom tapered surface, said bracket comprising a first recessed groove and a second recessed groove, said first recessed groove being located adjacent to said first bottom tapered surface, said first bottom tapered surface defining at least a portion of said first recessed groove, said second recessed groove being located adjacent to said second bottom tapered surface, said second bottom tapered surface defining at least a portion of said second recessed groove, said first recessed groove being point symmetrical to said second recessed groove, said first bottom tapered surface being point symmetrical to said second bottom tapered surface, said first flat sliding contact surface being continuously connected with said first bottom tapered surface, said second flat sliding contact surface being continuously connected with said second bottom tapered surface, said first protrusion being moveable from said first recessed groove along said first tapered bottom surface to said first sliding contact surface, said second protrusion being moveable from said second recessed groove along said second tapered bottom to said second sliding contact surface, said first protrusion having a first flat top portion, wherein at least one end of said first flat top portion comprises a first protrusion tapered portion, said first protrusion tapered portion being continuous with said first flat top portion, wherein sliding contact with said first protrusion is prevented at one end in said first recessed groove, said second protrusion having a second flat top portion, wherein at least one end of said second flat top portion comprises a second protrusion tapered portion, wherein sliding contact with said second protrusion is prevented at one end in said second recessed groove, wherein contact between said first protrusion and said first bottom tapered surface and contact between said second protrusion and said second bottom tapered surface generates a first contact force and contact between said first protrusion and said first sliding contact surface and contact between said second protrusion and said second sliding contact surface generates a second contact force, said first contact force being less than said second contact force.

2. A hinge device according to claim 1, wherein said other member is in a closed position with said first bottom tapered surface arranged on a first end edge of said first recessed groove and said second bottom tapered surface arranged on a second end edge of said second recessed groove.

* * * * *